United States Patent [19]

Jameson

[11] Patent Number: 6,020,277

[45] Date of Patent: Feb. 1, 2000

[54] POLYMERIC STRANDS WITH ENHANCED TENSILE STRENGTH, NONWOVEN WEBS INCLUDING SUCH STRANDS, AND METHODS FOR MAKING SAME

[75] Inventor: Lee Kirby Jameson, Roswell, Ga.

[73] Assignee: Kimberly-Clark Corporation, Neenah, Wis.

[21] Appl. No.: 08/644,591

[22] Filed: May 10, 1996

Related U.S. Application Data

[63] Continuation-in-part of application No. 08/576,174, Dec. 21, 1995, which is a continuation-in-part of application No. 08/576,543, Dec. 21, 1995, and a continuation-in-part of application No. 08/477,689, Jun. 7, 1995, which is a continuation-in-part of application No. 08/264,548, Jun. 23, 1994, abandoned.

[51] Int. Cl.$^7$ .............................. B01J 13/14; B05B 1/08; B01F 11/02; D02G 3/06

[52] U.S. Cl. ......................... 442/414; 252/314; 252/309; 252/312; 239/102.2; 366/127; 366/176; 428/364; 428/401

[58] Field of Search ..................................... 252/314, 309, 252/312; 239/102.2; 366/127, 176.1; 428/224

[56] References Cited

U.S. PATENT DOCUMENTS

| | | | |
|---|---|---|---|
| 2,484,012 | 10/1949 | Calhoun, Jr. | 18/54 |
| 2,484,014 | 10/1949 | Peterson et al. | 18/54 |
| 2,745,136 | 5/1956 | Deboutteville | 18/8 |
| 3,016,599 | 1/1962 | Perry, Jr. | 28/78 |
| 3,042,481 | 7/1962 | Coggeshall | 18/54 |
| 3,071,809 | 1/1963 | Lerch et al. | 18/13 |
| 3,194,855 | 7/1965 | Jones et al. | 264/70 |

(List continued on next page.)

FOREIGN PATENT DOCUMENTS

| | | |
|---|---|---|
| 9006657 | 7/1993 | Czechoslovakia . |
| 36617 | 9/1981 | European Pat. Off. . |
| 202100 | 11/1986 | European Pat. Off. . |
| 202381 | 11/1986 | European Pat. Off. . |
| 202844 | 11/1986 | European Pat. Off. . |
| 0 235 603 | 9/1987 | European Pat. Off. . |
| 235603 | 9/1987 | European Pat. Off. . |
| 251524 | 1/1988 | European Pat. Off. . |
| 300198 | 1/1989 | European Pat. Off. . |
| 0 303 889 | 2/1989 | European Pat. Off. . |
| 303998 | 2/1989 | European Pat. Off. . |
| 0 465 660 | 1/1992 | European Pat. Off. . |
| 495506 | 7/1992 | European Pat. Off. . |
| 2734818 | 8/1976 | Germany . |
| 134052 | 2/1979 | Germany . |
| 177045 | 2/1979 | Germany . |
| 138523 | 11/1979 | Germany . |
| 3010985 | 10/1981 | Germany . |
| 3912524A1 | 11/1989 | Germany . |
| 49-133613 | 12/1974 | Japan . |
| 56-144214 | 11/1981 | Japan . |
| 57-51441 | 3/1982 | Japan . |
| 57-078967 | 5/1982 | Japan . |
| 57-099327 | 9/1982 | Japan . |
| 62-160110 | 7/1987 | Japan . |
| 49133613A | 12/1997 | Japan . |
| 386977 | 5/1972 | Russian Federation . |
| 468948 | 7/1975 | Russian Federation . |
| 449504 | 10/1975 | Russian Federation . |
| 532529 | 5/1977 | Russian Federation . |
| 706250 | 12/1979 | Russian Federation . |
| 1479464 | 5/1989 | Russian Federation . |
| 1812332 | 4/1993 | Russian Federation . |
| 1263159 | 2/1972 | United Kingdom . |
| 1382828 | 2/1975 | United Kingdom . |
| 1415539 | 11/1975 | United Kingdom . |
| 1432760 | 4/1976 | United Kingdom . |
| 2077351 | 12/1981 | United Kingdom . |
| 2082251 | 3/1982 | United Kingdom . |
| 2274877 | 8/1994 | United Kingdom . |
| 1555766 | 11/1997 | United Kingdom . |
| 9301404 | 1/1993 | WIPO . |
| 96/00318 | 1/1996 | WIPO . |

OTHER PUBLICATIONS

Abstract for EP 0 303 889 dated Feb. 22, 1989.
Abstract for SU 1,479,464 dated May 15, 1989.
D'Alelio, G.F., Fundamental Principles of Polymerization, John Wiley & Sons, Inc., pp. 100–101, Dec. 1952.
V.A. Wente, "Superfine Thermooplastic Fibers", *Industrial & Engineering Chemistry*, V. 48, N. 8, Naval Research Laboratory, Washington, D.C., pp. 1342–1346.
Wente, Boone & Fluharty, "Manufacture of Superfine Organic Fibers", Naval Research Laboratory, Washington, D.C., NRL Report 4364 (111437), May 24, 1954.
Buntin & Lohkamp, "Melt Blowing–A One–Step Web Process for New Nonwoven Products", *TAPPI Journal*, V. 56, No. 4, pp. 74–77.
John Wiley & Sons, "Ultrasonics", *Encyclopedia of Chemical Technology*, 3rd Ed., V. 23, pp. 462–479.
Degassing of Liquids, *Physical Principles of Ultrasonic Technology*, V. 1, Plenum Press, 1973, pp. 381–509.

*Primary Examiner*—Johann Richter
*Assistant Examiner*—Dominic Keating
*Attorney, Agent, or Firm*—Karl V. Sidor

[57] ABSTRACT

A melt-extrudable polymeric strand with enhanced tensile strength formed by extruding a melt-extrudable polymer while subjecting the a portion of the polymer to ultrasonic energy. The melt-extrudable polymeric strand has a tenacity which is from about 1.5 to about 3 times the tenacity of an otherwise identical strand not made by applying ultrasonic energy to a portion of the melt-extrudable polymer while the melt-extrudable polymer is extruded. Desirably, the strand has a tenacity within a range from about 0.3 to about 0.9 g/denier. In a method for making such a strand, a molten melt-extrudable polymer is extruded through a die assembly, ultrasonic energy is applied to a portion of the melt-extrudable polymer within the chamber and without applying ultrasonic energy to the die tip, while an extrusion exit orifice receives melt-extrudable polymer from an extrusion chamber, and the extruded polymer is attenuated to form a strand. The extrusion of the melt-extrudable polymer and the excitation of the means for applying ultrasonic energy are controlled such that the strand has the above-described tenacity. A nonwoven web comprises the strands with enhanced tensile strength.

36 Claims, 3 Drawing Sheets

U.S. PATENT DOCUMENTS

| | | | |
|---|---|---|---|
| 3,203,215 | 8/1965 | Jones | 72/253 |
| 3,233,012 | 2/1966 | Bodine | 264/23 |
| 3,285,442 | 11/1966 | Tigner et al. | 264/70 |
| 3,341,394 | 9/1967 | Kinney | 161/72 |
| 3,463,321 | 8/1969 | Van Ingen | 210/388 |
| 3,619,429 | 11/1971 | Torigai et al. | 264/23 |
| 3,655,862 | 4/1972 | Dorschner et al. | 264/290 |
| 3,668,185 | 6/1972 | Boutsicaris | 260/75 NH |
| 3,692,618 | 9/1972 | Doschner et al. | 161/72 |
| 3,704,198 | 11/1972 | Prentice | 161/148 |
| 3,705,068 | 12/1972 | Dobo et al. | 156/441 |
| 3,729,139 | 4/1973 | Tysk | 239/102 |
| 3,755,527 | 8/1973 | Keller et al. | 264/210 |
| 3,802,817 | 4/1974 | Matsuki et al. | 425/66 |
| 3,819,116 | 6/1974 | Goodinge et al. | 239/102 |
| 3,849,241 | 11/1974 | Butin et al. | 161/169 |
| 3,853,651 | 12/1974 | Porte | 156/73.6 |
| 3,884,417 | 5/1975 | Sheffield et al. | 239/102 |
| 3,949,127 | 4/1976 | Ostermeier et al. | 428/137 |
| 3,949,938 | 4/1976 | Goodinge | 239/102 |
| 3,977,604 | 8/1976 | Yokoyama et al. | 239/102 |
| 3,978,185 | 8/1976 | Butin et al. | 264/93 |
| 4,013,223 | 3/1977 | Martin | 239/102 |
| 4,038,348 | 7/1977 | Kompanek | 261/36 A |
| 4,064,605 | 12/1977 | Akiyama et al. | 28/103 |
| 4,067,496 | 1/1978 | Martin | 239/102 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,100,798 | 7/1978 | Nilsson et al. | 73/194 E |
| 4,105,004 | 8/1978 | Asai et al. | 123/141 |
| 4,118,531 | 10/1978 | Hauser | 428/224 |
| 4,121,549 | 10/1978 | Martin et al. | 123/23 EA |
| 4,127,087 | 11/1978 | Caves | 123/32 AE |
| 4,127,624 | 11/1978 | Keller et al. | 264/23 |
| 4,134,931 | 1/1979 | Hayes, Jr. et al. | 260/897 |
| 4,198,461 | 4/1980 | Keller et al. | 428/288 |
| 4,288,398 | 9/1981 | Lemelson | 264/23 |
| 4,340,563 | 7/1982 | Appel et al. | 264/518 |
| 4,372,491 | 2/1983 | Fishgal | 239/102 |
| 4,389,999 | 6/1983 | Jaqua | 123/536 |
| 4,405,297 | 9/1983 | Appel et al. | 425/72 |
| 4,418,672 | 12/1983 | Muller et al. | 123/478 |
| 4,434,204 | 2/1984 | Hartman et al. | 428/198 |
| 4,466,571 | 8/1984 | Muhlbauer | 239/101 |
| 4,496,101 | 1/1985 | Northman | 239/102 |
| 4,500,280 | 2/1985 | Astier et al. | 425/569 |
| 4,521,364 | 6/1985 | Norota et al. | 264/176 |
| 4,526,733 | 7/1985 | Lau | 264/12 |
| 4,529,792 | 7/1985 | Barrows | 528/291 |
| 4,563,993 | 1/1986 | Yamauchi et al. | 123/478 |
| 4,576,136 | 3/1986 | Yamauchi et al. | 123/590 |
| 4,590,915 | 5/1986 | Yamauchi et al. | 123/590 |
| 4,627,811 | 12/1986 | Greiser et al. | 425/72 |
| 4,644,045 | 2/1987 | Fowells | 526/348 |
| 4,663,220 | 5/1987 | Wisneski et al. | 428/221 |
| 4,665,877 | 5/1987 | Manaka et al. | 123/472 |
| 4,715,353 | 12/1987 | Koike et al. | 123/590 |
| 4,716,879 | 1/1988 | Takayama et al. | 123/590 |
| 4,726,522 | 2/1988 | Kokubo et al. | 239/102.2 |
| 4,726,523 | 2/1988 | Kokubo et al. | 239/102.2 |
| 4,726,524 | 2/1988 | Ishikawa et al. | 239/102.2 |
| 4,726,525 | 2/1988 | Yonekawa et al. | 239/102.2 |
| 4,742,810 | 5/1988 | Anders et al. | 123/538 |
| 4,756,478 | 7/1988 | Endo et al. | 239/102.2 |
| 4,793,954 | 12/1988 | Lee et al. | 264/23 |
| 4,815,192 | 3/1989 | Usui et al. | 29/509 |
| 4,974,780 | 12/1990 | Nakamura et al. | 239/102.2 |
| 4,986,248 | 1/1991 | Kobayaski et al. | 123/590 |
| 4,995,367 | 2/1991 | Yamauchi et al. | 123/494 |
| 5,017,311 | 5/1991 | Furusawa et al. | 264/23 |
| 5,068,068 | 11/1991 | Furusawa et al. | 264/23 |
| 5,110,286 | 5/1992 | Gaysert et al. | 431/208 |
| 5,112,206 | 5/1992 | Stewart | 425/114 |
| 5,114,633 | 5/1992 | Stewart | 264/23 |
| 5,160,746 | 11/1992 | Dodge, II et al. | 425/7 |
| 5,169,067 | 12/1992 | Matsusaka et al. | 239/102.2 |
| 5,179,923 | 1/1993 | Tsurutani et al. | 123/435 |
| 5,226,364 | 7/1993 | Fadner | 101/366 |
| 5,269,981 | 12/1993 | Jameson et al. | 264/23 |
| 5,330,100 | 7/1994 | Malinowski | 239/102.2 |
| 5,382,400 | 1/1995 | Pike et al. | 264/168 |

FIG. 3

POLYMERIC STRANDS WITH ENHANCED TENSILE STRENGTH, NONWOVEN WEBS INCLUDING SUCH STRANDS, AND METHODS FOR MAKING SAME

CROSS-REFERENCE TO RELATED APPLICATIONS

This application is a continuation-in-part of U.S. application Ser. No. 08/576,174 filed in the U.S. Patent Office on Dec. 21, 1995 in the names of B. Cohen et al. and entitled "An Ultrasonic Apparatus and Method For Increasing the Flowrate of a Liquid Through an Orifice", a continuation-in-part of U.S. application Ser. No. 08/576,543 filed in the U.S. Patent Office on Dec. 21, 1995 in the names of L. K. Jameson et al. and entitled "An Apparatus and Method For Emulsifying a Pressurized Multicomponent Liquid", and a continuation-in-part of U.S. application Ser. No. 08/477,689 filed in the U.S. Patent Office on Jun. 7, 1995 in the names of L. K. Jameson et al. and entitled "Method And Apparatus For Increasing the Flowrate of a Liquid Through an Orifice", which is a continuation-in-part of U.S. patent application Ser. No. 08/264,548 filed in the U.S. Patent Office on Jun. 23, 1994 in the name of L. K. Jameson and entitled "Method and Apparatus for Ultrasonically Assisted Melt Extrusion of Fibers," now abandoned the subject matter of which applications is hereby incorporated by reference in their entirety.

TECHNICAL FIELD

This invention relates to polymeric strands made by melt-extruding a polymer and nonwoven webs made with such strands.

BACKGROUND OF THE INVENTION

The melt-extrusion of liquids, such as, for example, thermoplastic polymers, to form fibers and nonwoven webs generally involves forcing a molten polymer through a plurality of orifices to form a plurality of molten threadlines, contacting the molten threadlines with a fluid, usually air, directed so as to form strands (filaments or fibers) and attenuate them. The attenuated strands then are randomly deposited on a surface to form a nonwoven web.

The more common and well known processes utilized for the preparation of nonwoven webs are meltblowing, coforming, and spunbonding.

Meltblowing references include, by way of example, U.S. Pat. No. 3,016,599 to Perry, Jr., U.S. Pat. No. 3,704,198 to Prentice, U.S. Pat. No. 3,755,527 to Keller et al., U.S. Pat. No. 3,849,241 to Butin et al., U.S. Pat. No. 3,978,185 to Butin et al., and U.S. Pat. No. 4,663,220 to Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing —A One-Step Web Process for New Nonwoven Products", *Journal of the Technical Association of the Pulp and Paper Industry*, Vol. 56, No.4, pp. 74–77 (1973).

Coforming references (i.e., references disclosing a meltblowing process in which fibers or particles are commingled with the meltblown fibers as they are formed) include U.S. Pat. No. 4,100,324 to Anderson et al. and U.S. Pat. No. 4,118,531 to Hauser.

Finally, spunbonding references include, among others, U.S. Pat. No. 3,341,394 to Kinney, U.S. Pat. No. 3,655,862 to Dorschner et al., U.S. Pat. No. 3,692,618 to Dorschner et al., U.S. Pat. No. 3,705,068 to Dobo et al., U.S. Pat. No. 3,802,817 to Matsuki et al., U.S. Pat. No. 3,853,651 to Porte, U.S. Pat. No. 4,064,605 to Akiyama et al., U.S. Pat. No. 4,091,140 to Harmon, U.S. Pat. No. 4,100,319 to Schwartz, U.S. Pat. No. 4,340,563 to Appel and Morman, U.S. Pat. No. 4,405,297 to Appel and Morman, U.S. Pat. No. 4,434,204 to Hartman et al., U.S. Pat. No. 4,627,811 to Greiser and Wagner, and U.S. Pat. No. 4,644,045 to Fowells.

Nonwoven webs have many uses including cleaning products such as towels and industrial wipes, personal care items such as incontinence products, infant care products, and absorbent feminine care products, and garments such as medical apparel. Polymeric strands with a high level of strength, particularly, tensile strength or tenacity, are often desirable for these applications. Typical methods of enhancing the tensile strength of a fiber or filament include increasing the denier of the fiber or filament, changing the polymer to a higher strength polymer, or adding strength enhancing ingredients to the polymer. Although these methods are often suitable, they can affect other physical properties of melt-extruded polymeric strands and nonwoven materials made therewith, such as softness and feel. Accordingly, there remains a need for melt-extruded strands and nonwovens with enhanced strength and methods of making such strands without substantially altering other physical properties of the materials.

SUMMARY OF THE INVENTION

This invention addresses some of the needs described above by providing a melt-extruded polymeric strand having enhanced tensile strength, particularly, an enhanced tenacity. This invention also encompasses a method for making such a strand by extruding a melt-extrudable polymer while applying ultrasonic energy to a portion of the melt-extrudable polymer. This invention further encompasses a nonwoven web and a method for making a nonwoven web comprising such a melt-extruded polymeric strand.

More particularly, the melt-extruded polymeric strand of this invention has enhanced tensile strength formed by extruding a melt-extrudable polymer while subjecting the a portion of the polymer to ultrasonic energy. The melt-extrudable polymeric strand has a tenacity which is about 1.5 to about 3 times the tenacity of an otherwise identical strand not made by applying ultrasonic energy to a portion of the melt-extrudable polymer while the melt-extrudable polymer is extruded. Desirably, the strand has a tenacity within a range from about 0.3 to about 0.9 g/denier.

More particularly, the method of this invention for making polymeric strands with enhanced strength includes extruding a melt-extrudable polymer through a die assembly, applying ultrasonic energy to a portion of the melt-extrudable polymer, and attenuating the extruded polymer to form a strand. The die assembly includes a die housing and a device for applying ultrasonic energy to the melt-extrudable polymer. The die housing comprises a chamber adapted to receive the melt-extrudable polymer, an inlet adapted to supply the chamber with the melt-extrudable polymer, and an exit orifice defined by the walls of a die tip. The exit orifice is adapted to receive the melt-extrudable polymer from the chamber and pass the melt-extrudable polymer out of the die housing.

The ultrasonic energy is applied to a portion of the melt-extrudable polymer within the chamber and without applying ultrasonic energy to the die tip, while the exit orifice receives the melt-extrudable polymer from the die housing chamber. Consequently, as the melt-extrudable polymer passes out of the exit orifice in the die tip, the melt-extrudable polymer is at least partially oriented and the tensile strength of the strand is enhanced.

Nonwoven webs made with the above-described polymeric strands are made by depositing the polymeric strands onto a collecting surface such as in meltblowing, coforming, or spunbonding techniques.

Other objects and the broad scope of the applicability of this invention will become apparent to those of skill in the art from the details given hereinafter. However, it should be understood that the detailed description of the preferred embodiments of the invention is given only by way of illustration because various changes and modifications well within the scope of the invention should become apparent to those of skill in the art in view of the following detailed description.

DETAILED DESCRIPTION OF EMBODIMENTS OF THE INVENTION

As summarized above, this invention encompasses melt-extruded polymeric strands with enhanced tensile strength, nonwoven webs made with such strands and methods for making the foregoing. After defining certain terms used herein, an apparatus for use in making strands in accordance with an embodiment of this invention is described, followed by a description of methods for using the apparatus and particular examples of polymeric strands made with the apparatus.

As used herein, the term "strand" refers to an elongated extrudate formed by passing a polymer through a forming orifice such as a die. Strands include fibers, which are discontinuous strands having a definite length, and filaments, which are continuous strands of material.

As used herein, the term "nonwoven web" means a web of material which has been formed without use of weaving processes which produce a structure of individual strands which are interwoven in an identifiable repeating manner. Nonwoven webs may be formed by a variety of processes such as meltblowing processes, spunbonding processes, film aperturing processes, coforming processes, and staple fiber carding processes.

As used herein, the term "tenacity" means the tensile strength of a strand for a given size of strand and the term "tensile strength" means the maximum stress a material subjected to a stretching load can withstand without tearing.

As used herein, the terms "thermoplastic polymer" and "thermoplastic material" refer to a high polymer that softens when exposed to heat and returns to its original condition when cooled to room temperature. The terms are meant to include any thermoplastic polymer which is capable of being melt-extruded. The term also is meant to include blends of two or more polymers and alternating, random, and block copolymers. Examples of thermoplastic polymers include, by way of illustration only, end-capped polyacetals, such as poly(oxymethylene) or polyformaldehyde, poly (trichloroacetaldehyde), poly(n-valeraldehyde), poly (acetaldehyde), poly(propionaldehyde), and the like; acrylic polymers, such as polyacrylamide, poly(acrylic acid), poly (methacrylic acid), poly(ethyl acrylate), poly(methyl methacrylate), and the like; fluorocarbon polymers, such as poly(tetrafluoroethylene), perfluorinated ethylene-propylene copolymers, ethylene-tetrafluoroethylene copolymers, poly (chlorotrifluoroethylene), ethylene-chlorotrifluoroethylene copolymers, poly(vinylidene fluoride), poly(vinyl fluoride), and the like; polyamides, such as poly(6-aminocaproic acid) or poly(caprolactam), poly(hexamethylene adipamide), poly (hexamethylene sebacamide), poly(11aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy2,6-dimethyl- 1,4-phenylene) or poly(p-phenylene oxide), and the like; polyaryl sulfones, such as poly(oxy-1,4phenylenesulfonyl- 1,4-phenyleneoxy-1,4-phenyleneisopropylidene-1,4-phenylene), poly (sulfonyl-1,4phenyleneoxy-1,4-phenylenesulfonyl-4,4'-biphenylene), and the like; polycarbonates, such as poly (bisphenol A) or poly(carbonyldioxy-1,4-phenyleneisopropylidene-1,4phenylene), and the like; polyesters, such as poly(ethylene terephthalate), poly (tetramethylene terephthalate), poly(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly (thio-1,4-phenylene), and the like; polyimides, such as poly (pyromellitimido-1,4-phenylene), and the like; polyolefins, such as polyethylene, polypropylene, poly(1-butene), poly (2-butene), poly(1-pentene), poly(2pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly (vinylidene chloride), polystyrene, and the like; copolymers of the foregoing, such as acrylonitrile-butadiene-styrene (ABS) copolymers, and the like; and the like.

By way of example, the thermoplastic polymer may be a polyolefin, examples of which are listed above. As a further example, the thermoplastic polymer may be a polyolefin which contains only hydrogen and carbon atoms and which is prepared by the addition polymerization of one or more unsaturated monomers. Examples of such polyolefins include, among others, polyethylene, polypropylene, poly (1-butene), poly(2butene), poly(1-pentene), poly(2-pentene), poly(3methyl-1-pentene), poly(4-methyl-1-pentene), 1,2-poly-1,3-butadiene, 1,4-poly-1,3-butadiene, polyisoprene, polystyrene, and the like, as well as blends of two or more such polyolefins and alternating, random, and block copolymers prepared from two or more different unsaturated monomers.

As used herein, the term "node" means the point on the longitudinal excitation axis of the ultrasonic horn at which no longitudinal motion of the horn occurs upon excitation by ultrasonic energy. The node sometimes is referred to in the art, as well as in this specification, as the nodal point.

The term "close proximity" is used herein in a qualitative sense only. That is, the term is used to mean that the means for applying ultrasonic energy is sufficiently close to the exit orifice (e.g., extrusion orifice) to apply the ultrasonic energy primarily to the melt-extrudable polymer passing into the exit orifice (e.g., extrusion orifice). The term is not used in the sense of defining specific distances from the extrusion orifice.

Generally speaking, the apparatus of the present invention includes a die housing and a means for applying ultrasonic energy to a portion of a pressurized liquid such as a molten thermoplastic polymer. The die housing defines a chamber adapted to receive the melt-extrudable polymer, an inlet (e.g., inlet orifice) adapted to supply the chamber with the melt-extrudable polymer, and an exit orifice (e.g., extrusion orifice) adapted to receive the melt-extrudable polymer from the chamber and pass the melt-extrudable polymer out of the exit orifice of the die housing. The means for applying ultrasonic energy is located within the chamber. For example, the means for applying ultrasonic energy can be located partially within the chamber or the means for applying ultrasonic energy can be located entirely within the chamber.

Figure 1:
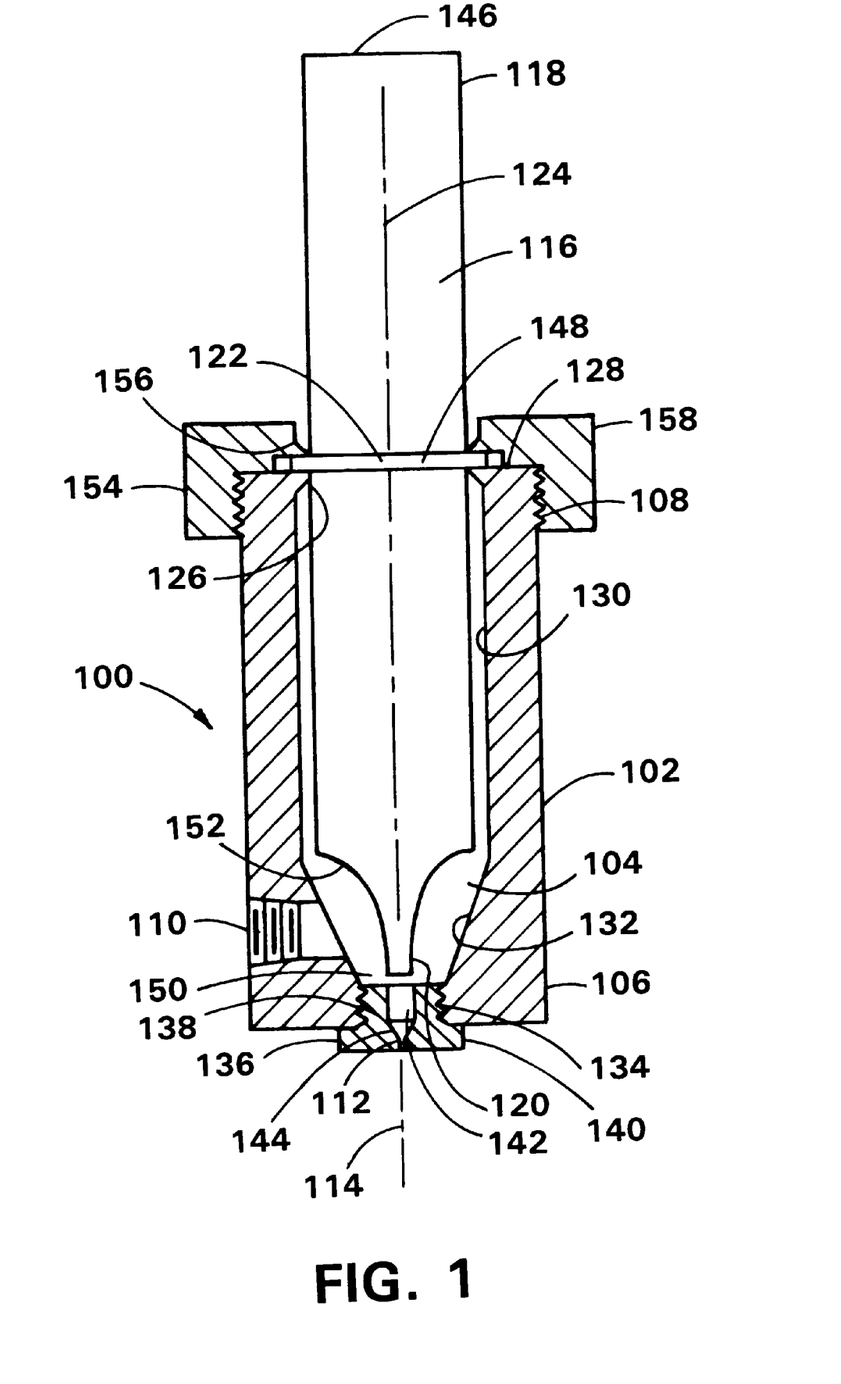
FIG. 1 is a cross-sectional elevation view of an apparatus for making an embodiment of the present invention.

Referring now to FIG. 1, there is shown, not necessarily to scale, an exemplary apparatus for extruding a melt-extrudable polymer. The apparatus 100 includes a die housing 102 which defines a chamber 104 adapted to receive a pressurized liquid such as molten thermoplastic polymer. The die housing 102 has a first end 106 and a second end 108. The die housing 102 also has an inlet 110 (e.g., inlet orifice) adapted to supply the chamber 104 with the melt-extrudable polymer. An exit orifice 112 (which may also be referred to as an extrusion orifice) is located in the first end 106 of the die housing 102; it is adapted to receive the melt-extrudable polymer from the chamber 104 and pass the melt-extrudable polymer out of the die housing 102 along a first axis 114. An ultrasonic horn 116 is located in the second end 108 of the die housing 102. The ultrasonic horn has a first end 118 and a second end 120. The horn 116 is located in the second end 108 of the die housing 102 in a manner such that the first end 118 of the horn 116 is located outside of the die housing 102 and the second end 120 of the horn 116 is located inside the die housing 102, within the chamber 104, and is in close proximity to the exit orifice 112. The horn 116 is adapted, upon excitation by ultrasonic energy, to have a nodal point 122 and a longitudinal mechanical excitation axis 124. Desirably, the first axis 114 and the mechanical excitation axis 124 will be substantially parallel. More desirably, the first axis 114 and the mechanical excitation axis 124 will substantially coincide, as shown in FIG. 1.

The size and shape of the apparatus of the present invention can vary widely, depending, at least in part, on the number and arrangement of exit orifices (e.g., extrusion orifices) and the operating frequency of the means for applying ultrasonic energy. For example, the die housing may be cylindrical, rectangular, or any other shape. Moreover, the die housing may have a single exit orifice or a plurality of exit orifices. A plurality of exit orifices may be arranged in a pattern, including but not limited to, a linear or a circular pattern.

The means for applying ultrasonic energy is located within the chamber, typically at least partially surrounded by the melt-extrudable polymer. Such means is adapted to apply the ultrasonic energy to the melt-extrudable polymer as it passes into the exit orifice. Stated differently, such means is adapted to apply ultrasonic energy to a portion of the melt-extrudable polymer in the vicinity of each exit orifice. Such means may be located completely or partially within the chamber.

When the means for applying ultrasonic energy is an ultrasonic horn, the horn conveniently extends through the die housing, such as through the first end of the housing as identified in FIG. 1. However, the present invention comprehends other configurations. For example, the horn may extend through a wall of the die housing, rather than through an end. Moreover, neither the first axis nor the longitudinal excitation axis of the horn need to be vertical. If desired, the longitudinal mechanical excitation axis of the horn may be at an angle to the first axis. Nevertheless, the longitudinal mechanical excitation axis of the ultrasonic horn desirably will be substantially parallel with the first axis. More desirably, the longitudinal mechanical excitation axis of the ultrasonic horn desirably and the first axis will substantially coincide, as shown in FIG. 1.

If desired, more than one means for applying ultrasonic energy may be located within the chamber defined by the die housing. Moreover, a single means may apply ultrasonic energy to the portion of the melt-extrudable polymer which is in the vicinity of one or more exit orifices.

According to the present invention, the ultrasonic horn may be composed of a magnetostrictive material. The horn may be surrounded by a coil (which may be immersed in the melt-extrudable polymer) capable of inducing a signal into the magnetostrictive material causing it to vibrate at ultrasonic frequencies. In such cases, the ultrasonic horn can simultaneously be the transducer and the means for applying ultrasonic energy to the melt-extrudable polymer.

The application of ultrasonic energy to a plurality of exit orifices, such as in a meltblowing or spunbonding apparatus, may be accomplished by a variety of methods. For example, with reference again to the use of an ultrasonic horn, the second end of the horn may have a cross-sectional area which is sufficiently large so as to apply ultrasonic energy to the portion of the melt-extrudable polymer which is in the vicinity of all of the exit orifices in the die housing. In such case, the second end of the ultrasonic horn desirably will have a cross-sectional area approximately the same as or greater than a minimum area which encompasses all exit orifices in the die housing (i.e., a minimum area which is the same as or greater than the sum of the areas of the exit orifices in the die housing originating in the same chamber). Alternatively, the second end of the horn may have a plurality of protrusions, or tips, equal in number to the number of exit orifices. In this instance, the cross-sectional area of each protrusion or tip desirably will be approximately the same as or less than the cross-sectional area of the exit orifice with which the protrusion or tip is in close proximity.

The planar relationship between the second end of the ultrasonic horn and an array of exit orifices may also be shaped (e.g., parabolically, hemispherically, or provided with a shallow curvature) to provide or correct for certain spray patterns.

As already noted, the term "close proximity" is used herein to mean that the means for applying ultrasonic energy is sufficiently close to the exit orifice to apply the ultrasonic energy primarily to the melt-extrudable polymer passing into the exit orifice. The actual distance of the means for applying ultrasonic energy from the exit orifice in any given situation will depend upon a number of factors, some of which are the flow rate of the melt-extrudable polymer (e.g., the flow rate, rheological characteristics or the viscosity of melt-extrudable polymer), the cross-sectional area of the end of the means for applying the ultrasonic energy relative to the cross-sectional area of the exit orifice, the frequency of the ultrasonic energy, the gain of the means for applying the ultrasonic energy (e.g., the magnitude of the longitudinal mechanical excitation of the means for applying ultrasonic energy), the temperature of the melt-extrudable polymer, the rheological characteristics of the melt-extrudable polymer, and the rate at which the melt-extrudable polymer passes out of the exit orifice.

In general, the distance of the means for applying ultrasonic energy from the exit orifice in a given situation may be determined readily by one having ordinary skill in the art without undue experimentation. In practice, such distance will be in the range of from about 0.002 inch (about 0.05 mm) to about 1.3 inches (about 33 mm), although greater distances can be employed. Such distance determines the extent to which ultrasonic energy is applied to the melt-extrudable polymer other than that which is about to enter the exit orifice; i.e., the greater the distance, the greater the amount of melt-extrudable polymer which is subjected to ultrasonic energy. Consequently, shorter distances generally are desired in order to minimize degradation of the melt-extrudable polymer and other adverse effects which may result from exposure of the melt-extrudable polymer to the ultrasonic energy. Desirably, the means for applying ultrasonic energy is an immersed ultrasonic horn having a longitudinal mechanical excitation axis and in which the end of the horn located in the die housing nearest the orifice is in close proximity to the exit orifice but does not apply ultrasonic energy directly to the exit orifice.

One advantage of the foregoing apparatus is that it is self-cleaning. That is, the combination of supplied pressure and forces generated by ultrasonically exciting the means for supplying ultrasonic energy to the melt-extrudable polymer (without applying ultrasonic energy directly to the orifice) can remove obstructions that appear to block the exit orifice (e.g., extrusion orifice). According to the invention, the exit orifice is adapted to be self-cleaning when the means for applying ultrasonic energy is excited with ultrasonic energy (without applying ultrasonic energy directly to the orifice) while the exit orifice receives pressurized melt-extrudable polymer from the chamber and passes the melt-extrudable polymer out of the die housing.

In general, melt-extruded polymeric strands are formed with the extruder apparatus 100 illustrated in FIG. 1 by introducing a melt-extrudable polymer into the chamber 104 of the die housing 102 through the inlet 110 and exciting the ultrasonic horn 116 as the melt-extrudable polymer is extruded through the exit orifice 112. The ultrasonic energy applied by the ultrasonic horn 116 applies ultrasonic energy to a portion of the melt-extrudable polymer within the chamber and without applying ultrasonic energy to the die tip, while the melt-extrudable polymer is received and extruded through the exit orifice 112. After the melt-extrudable polymer is extruded through the exit orifice 112, the extruded polymer is attenuated to form a strand. The attenuation of the extruded polymer can be accomplished mechanically or by entraining the fiber in a fluid such as in a meltblowing or spunbonding process. To form a nonwoven web from the extruded strand, the strand is randomly deposited on a collecting surface. Nonwoven webs can also be prepared by extruding the melt-extrudable polymer and forming a strand, cutting the strand into staple fibers, and carding the staple fibers into a nonwoven web which can be subsequently bonded by known means.

The physical properties of the resulting melt-extruded polymeric strand depend largely on the melt-extruded polymer. Suitable melt-extrudable polymers are described above.

The polymeric strand formed with the melt-extrudable polymer and the application of ultrasonic energy as described above has a tenacity which is about 1.5 to about 3 times the tenacity of an otherwise identical strand made without the application of ultrasonic energy. More particularly, the tenacity of the strand can range from about 0.3 to about 0.9 g/denier. In a desirable embodiment, such a melt-extruded high tensile strength polymeric strand has a denier within the range from about 0.006 to about 250.

The present invention is further described by the examples which follow. Such examples, however, are not to be construed as limiting in any way either the spirit or the scope of the present invention.

EXAMPLES

Ultrasonic Horn Apparatus

The following is a description of an exemplary ultrasonic horn apparatus of the present invention generally as shown in FIG. 1.

With reference to FIG. 1, the die housing 102 of the apparatus was a cylinder having an outer diameter of 1.375 inches (about 34.9 mm), an inner diameter of 0.875 inch (about 22.2 mm), and a length of 3.086 inches (about 78.4 mm). The outer 0.312-inch (about 7.9-mm) portion of the second end 108 of the die housing was threaded with 16-pitch threads. The inside of the second end had a beveled edge 126, or chamfer, extending from the face 128 of the second end toward the first end 106 a distance of 0.125 inch (about 3.2 mm). The chamfer reduced the inner diameter of the die housing at the face of the second end to 0.75 inch (about 19.0 mm). An inlet 110 (also called an inlet orifice) was drilled in the die housing, the center of which was 0.688 inch (about 17.5 mm) from the first end, and tapped. The inner wall of the die housing consisted of a cylindrical portion 130 and a conical frustrum portion 132. The cylindrical portion extended from the chamfer at the second end toward the first end to within 0.992 inch (about 25.2 mm) from the face of the first end. The conical frustrum portion extended from the cylindrical portion a distance of 0.625 inch (about 15.9 mm), terminating at a threaded opening 134 in the first end. The diameter of the threaded opening was 0.375 inch (about 9.5 mm); such opening was 0.367 inch (about 9.3 mm) in length.

A die tip 136 was located in the threaded opening of the first end. The die tip consisted of a threaded cylinder 138 having a circular shoulder portion 140. The shoulder portion was 0.125 inch (about 3.2 mm) thick and had two parallel faces (not shown) 0.5 inch (about 12.7 mm) apart. An exit orifice 112 (also called an extrusion orifice) was drilled in the shoulder portion and extended toward the threaded portion a distance of 0.087 inch (about 2.2 mm). The diameter of the extrusion orifice was 0.0145 inch (about 0.37 mm). The extrusion orifice terminated within the die tip at a vestibular portion 142 having a diameter of 0.125 inch (about 3.2 mm) and a conical frustrum portion 144 which joined the vestibular portion with the extrusion orifice. The wall of the conical frustrum portion was at an angle of 30° from the vertical. The vestibular portion extended from the extrusion orifice to the end of the threaded portion of the die tip, thereby connecting the chamber defined by the die housing with the extrusion orifice.

The means for applying ultrasonic energy was a cylindrical ultrasonic horn 116. The horn was machined to resonate at a frequency of 20 kHz. The horn had a length of 5.198 inches (about 132.0 mm), which was equal to one-half of the resonating wavelength, and a diameter of 0.75 inch (about 19.0 mm). The face 146 of the first end 118 of the horn was drilled and tapped for a ⅜-inch (about 9.5-mm) stud (not shown). The horn was machined with a collar 148 at the nodal point 122. The collar was 0.094-inch (about 2.4-mm) wide and extended outwardly from the cylindrical surface of the horn 0.062 inch (about 1.6 mm). Thus, the diameter of the horn at the collar was 0.875 inch (about 22.2 mm). The second end 120 of the horn terminated in a small cylindrical tip 150 0.125 inch (about 3.2 mm) long and 0.125 inch (about 3.2 mm) in diameter. Such tip was separated from the cylindrical body of the horn by a parabolic frustrum portion 152 approximately 0.5 inch (about 13 mm) in length. That is, the curve of this frustrum portion as seen in cross-section was parabolic in shape. The face of the small cylindrical tip was normal to the cylindrical wall of the horn and was located about 0.4 inch (about 10 mm) from the extrusion orifice. Thus, the face of the tip of the horn, i.e., the second end of the horn, was located immediately above the vestibular opening in the threaded end of the die tip.

The first end 108 of the die housing was sealed by a threaded cap 154 which also served to hold the ultrasonic horn in place. The threads extended upwardly toward the top of the cap a distance of 0.312 inch (about 7.9 mm). The outside diameter of the cap was 2.00 inches (about 50.8 mm) and the length or thickness of the cap was 0.531 inch (about 13.5 mm). The opening in the cap was sized to accommodate the horn; that is, the opening had a diameter of 0.75 inch (about 19.0 mm). The edge of the opening in the cap was a chamfer 156 which was the mirror image of the chamfer at the second end of the die housing. The thickness of the cap at the chamfer was 0.125 inch (about 3.2 mm), which left a space between the end of the threads and the bottom of the chamfer of 0.094 inch (about 2.4 mm), which space was the same as the length of the collar on the horn. The diameter of such space was 1.104 inch (about 28.0 mm). The top 158 of the cap had drilled in it four ¼-inch diameter×¼-inch deep holes (not shown) at 90° intervals to accommodate a pin spanner. Thus, the collar of the horn was compressed between the two chamfers upon tightening the cap, thereby sealing the chamber defined by the die housing.

A Branson elongated aluminum waveguide having an input:output mechanical excitation ratio of 1:1.5 was coupled to the ultrasonic horn by means of a ⅜-inch (about 9.5-mm) stud. To the elongated waveguide was coupled a piezoelectric transducer, a Branson Model 502 Converter, which was powered by a Branson Model 1120 Power Supply operating at 20 kHz (Branson Sonic Power Company, Danbury, Conn.). Power consumption was monitored with a Branson Model A410A Wattmeter.

Example 1

A high tensile strength polymeric strand was made in accordance with an embodiment of this invention. A Grid Melter, Model GM-25-1 hydraulic pump system, obtained from J&M Laboratories Inc. of Dawsonville, Georgia was used to pump molten polymer through the extrusion apparatus. The device has the capability to process up to 25 pounds of polymer per hour (about 11 kilograms per hour), and has an integral variable speed gear pump with a displacement of 1.752 cc/revolution. Temperature of the melt is regulated in two zones, premelt and main melt. Pressure is limited and regulated by an internal variable by-pass valve, and indicated by digital readout resolved to increments of 10 psi. Pump drive speed is controlled by a panel mounted potentiometer.

The Grid Melter was used to melt and pressurize a thermoplastic polymer. The polymer used was Himont HH-441(Himont HH-441, Himont Company, Wilmington, Del.), a polypropylene having no melt processing additives and a melt flow rate of 400 grams per 10 minutes, or g/10 min. The melt flow rate is expressed in units of mass divided by time (i.e., grams/10 minutes). The melt flow rate was determined by measuring the mass of molten thermoplastic polymer under a 2.160 kg load that flowed through an orifice diameter of 2.0995±0.0051 mm during a specified time period such as, for example, 10 minutes at a specified temperature such as, for example, 180° C. as determined in accordance with ASTM Test Method D1238-82, "Standard Test Method for Flow Rates of Thermoplastic By Extrusion Plastometer," using a Model VE 4-78 Extrusion Plastometer (Tinius Olsen Testing Machine Co., Willow Grove, Pa.).

The Grid Melter pump drive speed was arbitrarily set at approximately 30 percent of the potentiometer range, and pressure was set and controlled by adjusting the by-pass valve. A 9-inch (about 23-cm) length of ¼-inch (about 6.4-mm) diameter stainless steel tubing was attached from the outlet of the Grid Melter to the inlet of the die housing. The tubing and the extrusion cup were wrapped with heat tape as two zones, and the two zones were set and controlled by automatic heat controllers. The heat zones in both the grid melter and the extrusion apparatus were set to 360° F. and allowed to stabilize.

Pressure of the Grid Melter was adjusted to 140 psi and polymer was extruded at a rate of about 1.4 g/min through the exit orifice of the extruder apparatus with ultrasonic energy applied at 30% of available power, drawing 35 watts. The resulting strand or fiber was drawn by gravity alone for a distance of 40 inches. The strand had a linear density of 123.68 denier.

Example 2 (Comparative)

A polymeric strand was made in accordance with the procedure of Example 1 except that the pressure of the grid melter was adjusted to 270 psi, the polymer flow rate was 1.43 grams per minute, and no ultrasonic energy was applied. The strand had a linear density of 254.46 denier.

Fifteen specimens of the strand from Example 1 and seventeen specimens of the strand from Example 2 were tested for tensile properties in accordance with ASTM D-3822 using the Instron Corporation Series IV Automated Materials Testing System 6.02. All specimens were tested at a sample rate of 18.06 points per second, a cross-head speed of 2.0 inches per minute, and a full scale load range of 500 grams under conditions of 50 percent humidity and a temperature of 73° F.

In summary, the mean tenacity at break of the strand from Example 1 was 0.4374 grams per denier and the mean tenacity at break of the strand from Comparative Example 2 was 0.1975 grams per denier. Accordingly, the tenacity of the strand from Example 1 made according to an embodiment of the present invention was more than twice that of the strand of Example 2 made without the application of ultrasonic energy. In terms of toughness, or energy absorbed, however, the values were lower for the strand made according to Example 1 than for the strand made according to Example 2.

Figure 2:
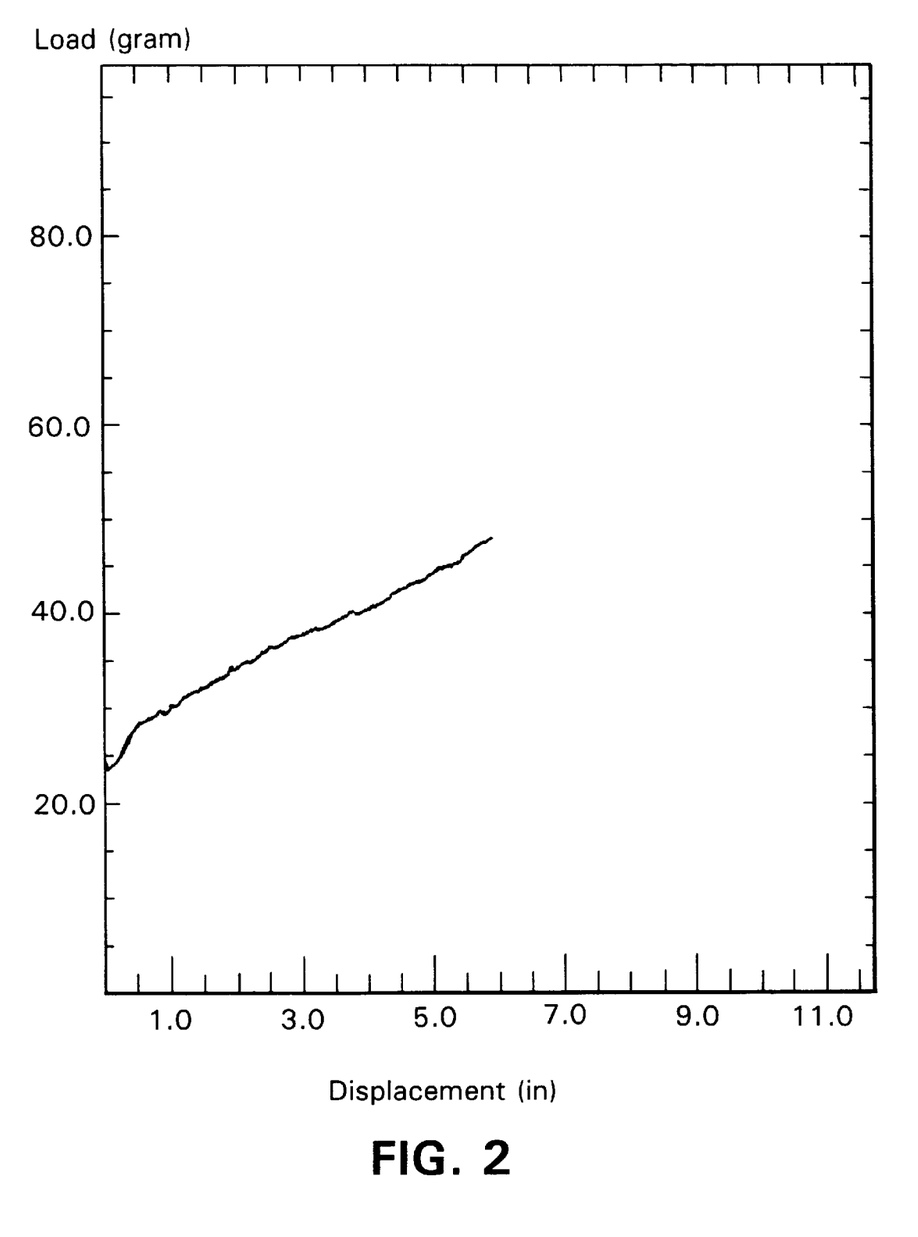
FIG. 2 is a graph illustrating average load versus displacement values for a strand made according to an embodiment of this invention.
Figure 3:
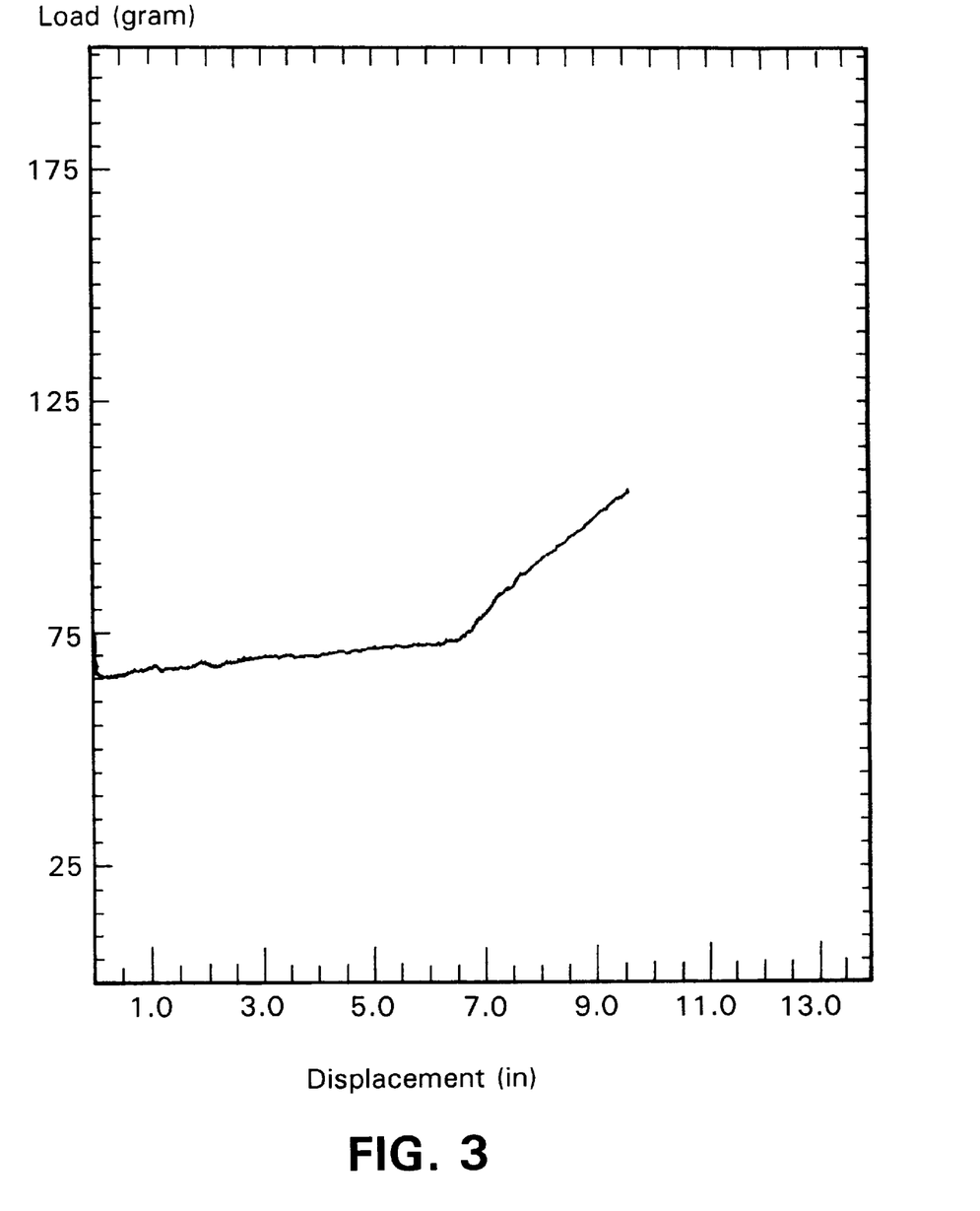
FIG. 3 is a graph illustrating average load versus displacement values for a conventional polymeric strand made without the use of ultrasonic energy.

The graphs in FIGS. 2 and 3 illustrate the difference in the tenacity of the strand of Example 1 made according to an embodiment of the present invention and the strand of Example 2 which is made without the application of ultrasonic energy. The graphs and FIGS. 2 and 3 plot the average load in grams on the strands versus the displacement of the strand by the load in inches. The curve illustrated in FIG. 3 for the strand of Example 2 shows a period of little load increase up to about 7 inches displacement, then a sharp increase in load up to the average point of break, which was under 10 inches. The curve illustrated in FIG. 2 for the sample from Example 1, on the other hand, shows an immediate rise in load at the onset of displacement, and the load increases at a substantially linear rate to the average point of break. This indicates that the strand made without the application of ultrasonic energy undergoes a period of crystal alignment during the initial displacement, with ultimate alignment occurring at the point where the load curve turns positive. It also indicates that there is a high degree of molecular orientation present in the strand formed in accordance with Example 1 using ultrasonic energy.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

We claim:

1. A melt-extruded polymeric strand comprising a melt-extrudable polymer, the strand formed at a substantially continuous pressure of at least 100 psig by applying ultrasonic energy to a portion of the melt-extrudable polymer while the melt-extrudable polymer is extruded and having a tenacity from about 1.5 to about 3 times the tenacity of an otherwise identical strand not made by applying ultrasonic energy to a portion of the melt-extrudable polymer while the melt-extrudable polymer is extruded.

2. The melt-extruded polymeric strand as in claim 1 wherein the strand has a tenacity within a range from about 0.3 to about 0.9 g/denier.

3. The melt-extruded polymeric strand as in claim 1 wherein the strand has a denier within the range from about 0.006 to about 250.

4. The melt-extruded polymeric strand as in claim 1 wherein the melt-extrudable polymer is a thermoplastic polymer.

5. The melt-extruded polymeric strand as in claim 1 wherein the melt-extrudable polymer comprises a polyolefin.

6. The melt-extruded polymeric strand as in claim 5 wherein the polyolefin is polypropylene.

7. The melt-extruded polymeric strand as in claim 1 wherein the strand is a fiber.

8. The melt-extruded polymeric strand as in claim 1 wherein the strand is a filament.

9. A nonwoven web comprising a plurality of the strands of claim 1.

10. A melt-extruded polymeric strand comprising a melt-extrudable polymer and having a tenacity within a range from about 0.3 to about 0.9 g/denier wherein the strand is formed at a substantially continuous pressure of at least 100 psig.

11. The melt-extruded polymeric strand as in claim 10 wherein the strand has a denier within the range from about 0.006 to about 250.

12. The melt-extruded polymeric strand as in claim 10 wherein the melt-extrudable polymer is a thermoplastic polymer.

13. The melt-extruded polymeric strand as in claim 10 wherein the melt-extrudable polymer comprises a polyolefin.

14. The melt-extruded polymeric strand as in claim 13 wherein the polyolefin is polypropylene.

15. The melt-extruded polymeric strand as in claim 10 wherein the strand is formed by applying ultrasonic energy to a portion of the melt-extrudable polymer while the melt-extrudable polymer is extruded.

16. The melt-extruded polymeric strand as in claim 10 wherein the strand is a fiber.

17. The melt-extruded polymeric strand as in claim 10 wherein the strand is a filament.

18. A nonwoven web comprising a plurality of the strands of claim 10.

19. A polymeric strand having an enhanced tensile strength made according to a method comprising the steps of:
 a. extruding a molten melt-extrudable polymer through a die assembly at a substantially continuous pressure of at least 100 psig, the die assembly comprising:
  i. a die housing including:
   a chamber adapted to receive the melt-extrudable polymer;
   an inlet adapted to supply the chamber with the melt-extrudable polymer; and
   an exit orifice defined by the walls of a die tip, the exit orifice being adapted to receive the melt-extrudable polymer from the chamber and pass the melt-extrudable polymer out of the die housing; and
  ii. means for applying ultrasonic energy to a portion of the melt-extrudable polymer within the housing, which means for applying ultrasonic energy is located within the chamber surrounded by the melt-extrudable polymer, and is adapted to apply the ultrasonic energy as the melt-extrudable polymer is passed out of the die housing through the exit orifice;
 b. exciting the means for applying ultrasonic energy to apply ultrasonic energy to a portion of the melt-extrudable polymer within the chamber and without applying ultrasonic energy to the die tip, while the exit orifice receives melt-extrudable polymer from the chamber; and
 c. attenuating the extruded polymer to form a strand, the extrusion of the melt-extrudable polymer and the excitation of the means for applying ultrasonic energy being controlled such that the tenacity of the strand is about 1.5 to about 3 times the tenacity of an otherwise identical strand not made by applying ultrasonic energy to a portion of the melt-extrudable polymer while the melt-extrudable polymer is extruded.

20. The strand as in claim 19 wherein the ultrasonic energy has a frequency of from about 15 kHz to about 100 kHz.

21. The strand as in claim 19 wherein the melt-extrudable polymer is a thermoplastic polymer.

22. The strand as in claim 19 wherein the melt-extrudable polymer comprises a polyolefin.

23. The strand as in claim 22 wherein the polyolefin is polypropylene.

24. The strand as in claim 19 wherein the extrusion of the melt-extrudable polymer and the excitation of the means for applying ultrasonic energy is controlled such that the strand has a tenacity within a range from about 0.3 to about 0.9 g/denier.

25. A polymeric strand having an enhanced tensile strength made according to a method comprising the steps of:
 a. extruding a molten melt-extrudable polymer through an extrusion orifice in a die assembly at a substantially continuous pressure of at least 100 psig, the die assembly comprising:
  i. a die housing defining:
   a chamber adapted to receive the melt-extrudable polymer, the chamber having a first end and a second end;
   an inlet orifice adapted to supply the chamber with the melt-extrudable polymer; and an extrusion orifice located in the first end of the chamber and adapted to receive the melt-extrudable polymer from the chamber and extrude the polymer along a first axis; and ii. an ultrasonic horn having a first end and a second end and adapted, upon excitation by ultrasonic energy, to have a node and a longitudinal mechanical excitation axis, the horn being located in the second end of the chamber in a manner such that the first end of the horn is located outside of the chamber and the second end of the horn is located within the chamber and is in close proximity to the extrusion orifice;

b. exciting the ultrasonic horn with ultrasonic energy while extruding the melt-extrudable polymer; and c. attenuating the extruded polymer to form a strand, the extrusion of the melt-extrudable polymer and the excitation of the ultrasonic horn being controlled such that the tenacity of the strand is about 1.5 to about 3 times the tenacity of an otherwise identical strand not made by applying ultrasonic energy to a portion of the melt-extrudable polymer while the melt-extrudable polymer is extruded.

26. The strand as in claim 25 wherein the ultrasonic energy has a frequency of from about 15 kHz to about 100 kHz.

27. The strand as in claim 25 wherein the melt-extrudable polymer is a thermoplastic polymer.

28. The strand as in claim 25 wherein the melt-extrudable polymer comprises a polyolefin.

29. The strand as in claim 28 wherein the polyolefin is polypropylene.

30. The strand as in claim 25 wherein the extrusion of the melt-extrudable polymer and the excitation of the means for applying ultrasonic energy is controlled such that the strand has a tenacity within a range from about 0.3 to about 0.9 g/denier.

31. The strand as in claim 25 wherein the longitudinal mechanical excitation axis is substantially parallel with the first axis.

32. The strand as in claim 25 wherein the second end of the ultrasonic horn has a cross-sectional area approximately the same as or less than a minimum area which encompasses all extrusion orifices in the die housing.

33. The strand as in claim 25 wherein attenuation is accomplished by contacting the threadline with a fluid stream as it exits the die.

34. The strand as in claim 25 wherein the vibrator means is a piezoelectric transducer.

35. The strand as in claim 25 wherein the piezoelectric transducer is coupled to the ultrasonic horn by means of an elongated waveguide.

36. The strand as in claim 26 wherein the elongated waveguide has an input:output mechanical excitation ratio of from about 1:1 to about 1:2.5.

* * * * *